March 18, 1969   J. H. LEMELSON   3,434,130
RECORD CARD SCANNING APPARATUS

Filed Dec. 10, 1964   Sheet 1 of 3

INVENTOR.
Jerome H. Lemelson

United States Patent Office 3,434,130
Patented Mar. 18, 1969

3,434,130
RECORD CARD SCANNING APPARATUS
Jerome H. Lemelson, 85 Rector St.,
Metuchen, N.J. 08840
Continuation-in-part of applications Ser. No. 142,748,
Aug. 28, 1961, and Ser. No. 347,524, Feb. 26, 1964.
This application Dec. 10, 1964, Ser. No. 417,386
U.S. Cl. 340—174.1   10 Claims
Int. Cl. G11b 5/00; G06k 7/00

ABSTRACT OF THE DISCLOSURE

A record card scanning apparatus is provided for recording on and reading record cards containing information recorded across at least one face of the cards. The apparatus is particularly applicable for business functions requiring the manual entry of data into a computer or storage device or the local monitoring of information. The card scanning apparatus includes a housing for reading transducers and a slot operative to receive and guide a card into the housing. Automatic control means is provided for driving the card during a reading function and for automatically conditioning the machine for the next reading cycle. The apparatus also includes means for selectively recording simple business information automatically upon the insertion of a card into a transducer housing.

---

This invention relates to apparatus for reading from and recording on predetermined areas of record cards and is a continuation-in-part application of copending applications entitled, Apparatus for Reading and Method, Ser. No. 347,524 now abandoned filed on Feb. 26, 1964, and Ser. No. 142,748 filed on Aug. 28, 1961.

In many business transactions there is often required a temporary record to indicate a temporary existing condition. For example, in the collection of road tolls, the driver of a motor vehicle is frequently required to receive and carry with him a record of where or at which entrance he entered the toll highway so that he may be correctly charged and correct payment may be made upon leaving the highway. The most common used form for indicating such information is a punched card. Such card frequently contains additional information such as date, accounting notations and the like and may also be used as a permanent record. In view of the large quantities of said cards utilized during a period of years for such purpose and the space required for their systematic storage, they present a considerable expense. There are numerous other business functions which entail the use of temporary and/or permanent record storage media such as punched cards, such media being costly, difficult to immediately interpret, and requiring relatively expensive handling equipment and substantial space for storage.

Accordingly, it is an important object of this invention to provide an improved record keeping system utilizing cards for the storage of information, such system being substantially simpler than conventional punched card systems.

A further object is to provide an improved record keeping system employing cards on which substantially more information may be recorded than on conventional punched cards.

Another object is to provide an improved card reading apparatus which automatically provides a visual indication in numerical and/or alphabetic notation of an invisible recording on a punched card and simultaneously provides a signal output representative of the recording thereon for transfer to a data processing device or other recorder.

Still another object is to provide an improved transducing device for reading record cards, such device receiving a record card from a predetermined entry position, deriving transduced signals from the card and thereafter returning it to the position from which it is received, thereby simplifying the manual entry of information.

Yet another object is to provide an improved system for recording simple business transactions such as road toll collections, which may be operated at substantially lower cost than the conventional punch card system.

The foregoing and other objects, features and advantages of the invention will be apparent from the following more particular descriptions of preferred embodiments of the invention as illustrated in the accompanying drawings.

FIG. 4 illustrates further details of FIGS. 2–4.

Figure 1:
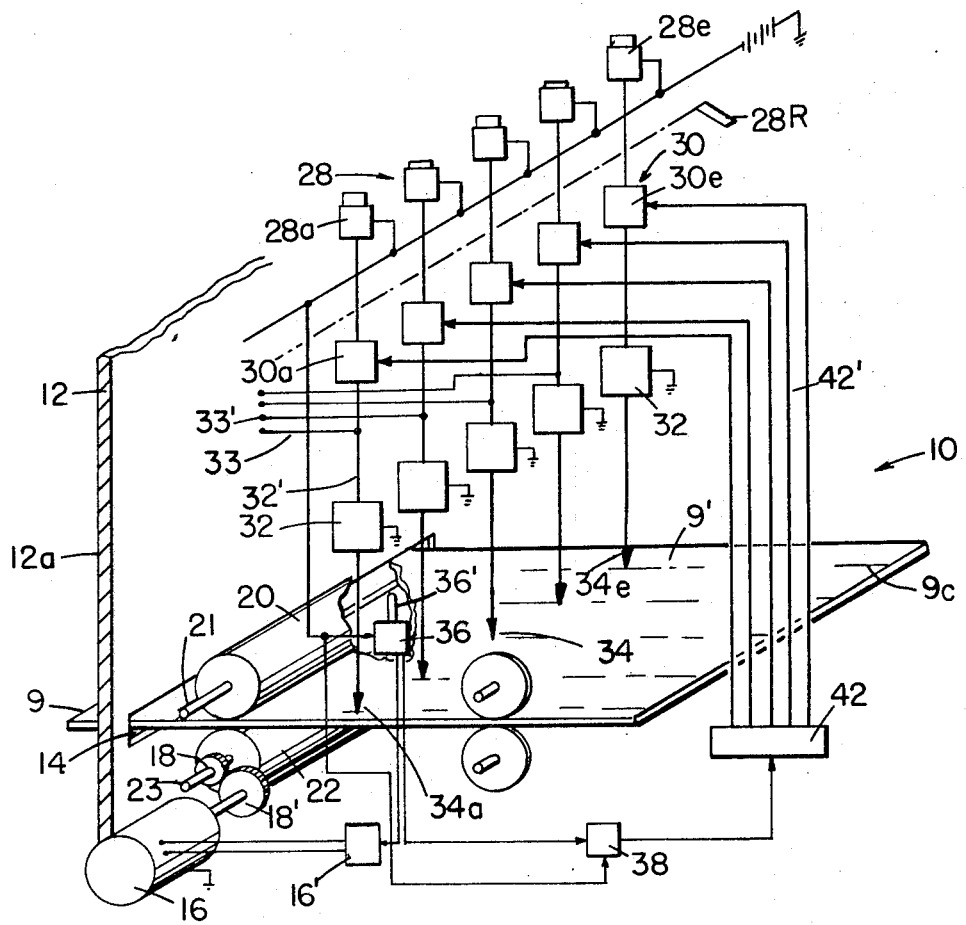
FIG. 1 is a schematic diagram of an automatic card recording apparatus constructed in accordance with the principles of the invention.

Referring now to FIG. 1, there is illustrated therein an apparatus 10 for recording a parallel code laterally across an elongated erasable recording member such as a self-supporting, oblong record card having plural recording channels 9c and which has a face thereof coated with or otherwise containing a sensitive recording material such as a magnetic oxide, thermoplastic recording material or other easily developable and preferably easily erasable material. Apparatus 10 comprises a housing 12, one wall 12a of which is shown as having a narrow opening or slit 14 provided therethrough through which an erasable recording card 9 may be inserted to be guided thereby between one or more pairs of drive rollers 20, 22 having shafts 21 and 23 which are supported in bearing by the side walls of housing 12. Lower drive roller 22 is shown operatively connected to a servo motor 16 through a conventional gear drive means such as gears 18 and 18'.

A limit switch 36 is mounted against the wall 12a and has a pivoting actuator arm 36' positioned to close the switch when a card is first inserted through opening 14. Actuation of switch 36 is operative to electrically effect the following actions: the startup of motor 16 by the connecting of a power supply to the starting control 16' thereof; the energizing of a time delay relay 38 which, when picked up, effects the recording of a parallel or in-line pulse code on a predetermined lateral area of the recording surface 9' of a card 9. By providing time delay relay 38 with an adjustable delay of a constant value, a parallel bit code may be recorded by means of a bank 34 of recording transducers which are positioned within the housing, as will hereinafter be described, to effect recording upon their actuation.

Figure 3:
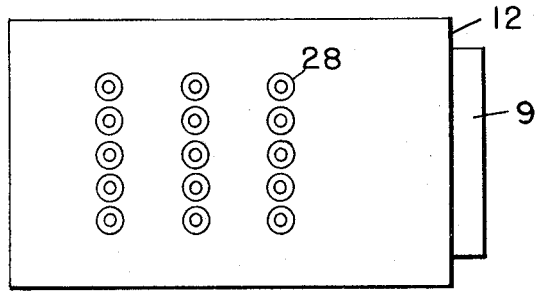
FIG. 3 is a plan view of the reader shown in FIG. 2.
Figure 4:
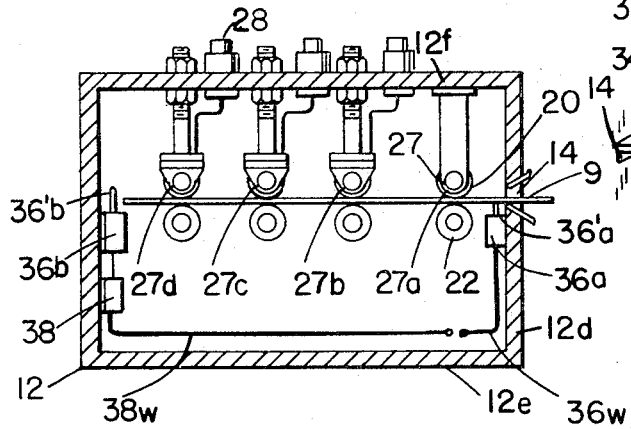
FIG. 4 is a side elevational view, partly broken away, of the device of FIGS. 2 and 3.
Figure 4:
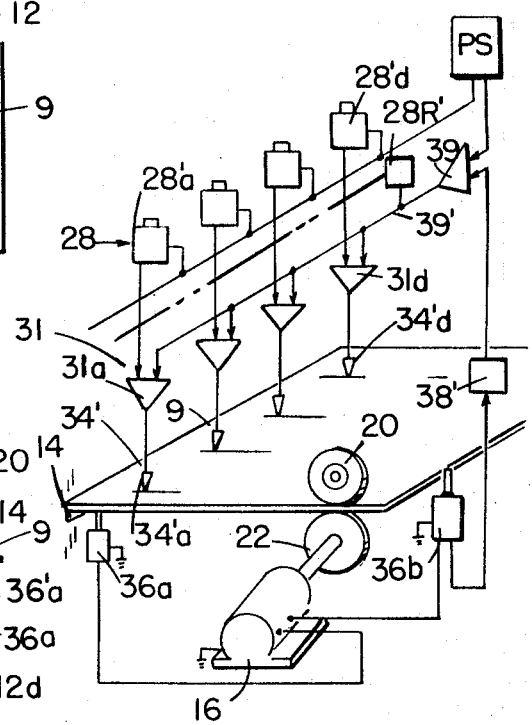

The parallel code is manually set up by depressing a plurality of bistable push button switches designated by the numerals 28a to 28e; the button switches preferably being secured to and projecting outwardly and upwardly from the top of housing 12 as shown in FIGS. 3 and 4. Push button switches 28a–28n are normally in the closed state and depressing them effects their opening. In other words, no code bit is recorded at a recording transducer when a card 9 is positioned at the recording location within the housing if an associated switch in bank 28 is depressed. Resetting of all push button switches to the normally closed position may be effected by operating a resetting toggle bar or switch 28R.

The code present on the switches illustrated in FIG. 1 comprises the binary notation 10101, since switches 28b and 28d are shown in the depressed or open state and switches 28a and 28c and 28e are in the closed state. In series circuit with the push button switches of bank 28 and the power supply are a corresponding pluarlity of normally open switches 30a to 30e which are momentarily closed when time delay relay 38 becomes energized. The pulse output of time delay relay 38 is applied through a multioutput pulse transformer 42 and to its output circuits 42' to the switching inputs of the respective switches 30a to 30e. The circuits of those pushbutton switches in the bank 28 are closed therefore and enable the passing of pulses to the respective recording heads 34 which are arranged in a row across and above the card to enable recording onto respective channels of the card. A parallel binary code may thus be recorded across a predetermined lateral area of the card, such code being representative of a decimal number or alpha-numeric information and being reproducible by a card reading device of similar design. Numeral 32 designates recording amplifiers.

The apparatus of FIG. 1 may be operated to drive a card 9 completely therethrough by making switch 36 a slow-to-open switch or the card may be driven to a fully-inserted position, stopped at the latter position and then automatically driven from the housing by the reversal of drive motor 16, motor 16 being reversed by also gating the output of delay relay 38 to the reverse control of motor 16, or by means of a second limit switch positioned to be actuated by the leading edge of the card during its forward travel into the housing, the second switch being operative to effect motor reversal. Such limit switches provided within the housing and actuable by means of a card inserted and driven through the housing are preferably spring biased to return to a neutral position after the card has passed the switch or is reverse driven therefrom. It is to be noted that a resetting bar 28R may be automatically operated by a servo receiving a signal generated by relay 38 to return all switches to their unactuated state. However, bar 28R is preferably manually resettable if it is desired to record same parallel code on a plurality of consecutively fed cards.

The apparatus 10 may also be utilized as a reading device for codes provided on the decording channels of a card such as 9 assuming that the heads or transducers 34 are operative in the scanning mode. Where both recording and reading are desired in a single device, each of the transducing devices 34 is either selectively operative to reproduce or record or comprises a side-by-side arrangement of separate recording and reproduction transducers disposed longitudinally to each scan the same respective track or channel of the card depending on which of the two is activated. Various magnetic transducers are known comprising a single head having coil windings so provided that the head may be operated in the recording erasure, or reproduction mode depending on which of the circuits are activated.

In FIG. 1, the amplifiers 32 are assumed to be operative in either the recording or reproduction mode and are all simultaneously controllable by a single control (not shown) to effect either the reading of recorded codes previously provided on the recording areas of the card 9 or the recording of signals thereon by the means described. Circuits 33 extend as outputs from each of the amplifiers 32 and connect to respective terminals 33' to which may be connected respective circuit means or lines extending to a computer, transmitter and/or display device for providing a visual display of the signals derived from scanning the recorded data.

In a mode of operation of the apparatus of FIG. 1 in which the cards have magnetic oxide coated thereon or laminated thereto, and wherein the card is to be utilized to effect a single transaction after which it is desired to reuse the card, the heads 34 may be operative to transduce the recordings on the various channels of the card recording area to electrical signals which are utilized as described, and to automatically erase each signal after it is so transduced. A specially designed head provided with a permanent magnetic erasure means situated on the downstream of the reproduction head portion thereof or a tandem array of heads on a common mount, one operative to reproduce signals and the second operative to erase the recordings after they have been so reproduced, may be provided to perform said dual functions each time a card is driven through or into the housing. In such an arrangement, the erasure means for each channel of the recording member is preferably adjustable by hand or capable of being selectively energized and deenergized by manually actuated switches accessible from the exterior of the housing 12 so as to permit the operator of the apparatus to selectively erase information from selected of the plurality of recording channels 9c of the recording member 9. Whereby certain recorded information may be retained while erasing the remaining channels.

The output of time delay relay 38, as stated hereinabove, is passed to a pulse transformer 42 having multiple outputs 42', each of which is applied to the switching input of a respective normally open switch in bank 30 which is momentarily closed by a pulse generated on the input thereto. Thus, if a push button switch of bank 28 connected thereto is open, a power pulse is passed through to the corresponding recording amplifier 32 and utilized to energize the respective recording transducer 34 for recording a pulse signal on a given track on the card.

Figure 2:
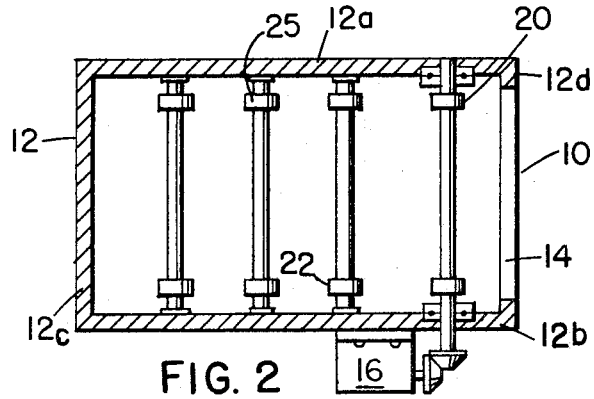
FIG. 2 is a plan view of a card transducing device partly broken away for clarity in visualization.

FIGS. 2 to 4 show further details of the apparatus illustrated in FIG. 1. As seen therein, apparatus 10 is provided with a box-like housing 12 having side walls 12a and 12b, end walls 12c and 12d, a bottom wall 12e and a top wall 12f. Supported by the side wall bearing are shafts for the first pair of drive rolls 20 and 22 which are driven by the reversible servo motor 16 shown mounted on the exterior of wall 12b. A plurality of guide rolls 25 for the card are also supported in bearing by the side walls of the housing and serve to further guide the card past one or more banks of recording transducers provided as assemblies 27 and designated by the numerals 27a, 27b, 27c, etc. A first limit switch 36a is shown mounted against the inside of the front wall 12d and has an actuator arm 36'a projecting upwardly into the path of the card when it is first inserted into the opening 14 in the front wall. Limit switch 36a is operative to start the motor driving the first pair of drive and guide rolls and to effect recording as described.

When a card 9 reaches the end of its travel, its leading edge is driven against the actuator arm 36'b of limit switch 36b which is actuated thereby and is operative to reverse the drive of motor 16 to drive card 9 from the housing. This action is effected by activating a time delay relay 38 which is in series circuit with switch 36b and a power supply as illustrated in FIG. 1 and which is operative to energize the reverse control of motor 16 for a sufficient period of time to drive the card from the housing after which relay 38 is automatically deenergized to shut off the motor.

The recording transducing assemblies 27 are illustrated in FIGS. 3 and 4 as a plurality of rows extending across the housing for automatically recording one or more parallel bit codes on the card when it has reached a predetermined position within the housing. While the recording transducers, designated generally by the numeral 26, may comprise magnetic recording heads, if thermoplastic or other charge-type recording is to be effected using the apparatus illustrated in FIGS. 2 to 4, the transducers may comprise means for generating a bit-charge in the charge storage area of the recording member when momentarily energized as described.

In FIG. 4, notation 36w refers to the output of switch 36a which is connected to the forward drive control of motor 16.

Notation 38w refers to the output line of time delay relay 38 which connects to the reverse drive control of the reversible motor 16 to effect reversal of the direction of rotation of the rollers to drive the card out of the housing. Line 38w remains energized a sufficient time interval to completely remove the card from the housing.

FIG. 4' illustrates further details of the control circuitry of the apparatus of FIGS. 2-4 particularly as applied to the recording of selected codes on the card 9. A single bank 28 of bistable push button switches 28'a to 28'd are conveniently located as described and may be selectively depressed to gate a power supply PS to inputs of respective AND switching elements 31a to 31d the outputs of which are connected to respective recording transducers 34'a to 34'd of a bank 34' of said transducers which are operative to engage or otherwise operatively couple with respective channels of the card 9 when driven therethrough. When the card 9 is first inserted in the opening 14 in the housing of the apparatus, switch 36a becomes activated by the leading edge of the card and transmits a pulse to the forward drive control of motor 16 causing said motor to rotate the drive rollers to move the card through the housing. When substantially fully driven into the housing, the leading edge of the card 9 activates switch 36b which transmits a pulse to a delay element or time delay relay 38' and the reverse drive control of motor 16. The output of relay 38' is passed to a logical AND switching element 39 having its other input activated by the power supply PS so that when 39 is energized by the pulse output of 38' the output 39' thereof will be pulsed. Said output 39' extends to the other switching inputs of the logical AND switching elements of one or more banks 31 thereof which extend to the recording transducers 34' of one or more of the banks thereof. As a result, when the output of relay 38' becomes activated a pulse is generated at each of the transducers 34' which is connected to those switches 28 which have been closed by manual or other means. The output of 39 is also shown connected to the energizing input of a servo or solenoid 28R' which is operative to actuate the resetting bar or plate 28R and thereby reset all or the depressed switches 28 of the entire device so that they need not be reset manually and are thereafter conditioned for the next recording function. If it is desired to prevent such resetting action, a manual switch may be disposed between circuit 39' and the input to servo 38R'.

It is noted that the time delay relay 38' may be such that recording is effected during the reverse travel of card 9 out of the housing and if 38' is adjustable, such recording may be effected along a selected, predetermined portion or portions of the card depending on the desires of the operator of the equipment or upon other requirements such as the locations of previous or future recordings thereon.

Similarly, if the transducers 34 contain electrically energized erasure means, adjustment of the time delay relay means 38' may be operative to erase signals from a selected portion of the recording member, which portion may comprise that containing a selected parallel code or codes. Or the apparatus may be operative, if the transducers 34 are electrically powered reproduction heads capable of becoming activated when the output of 38' is activated to effect one or more code recordings on a selected portion of the recording area of member 9.

In a preferred form of the invention, each head 34 may include erasure, recording and reproduction means any of which may be simultaneously or separately selectively operative at one time as the result of presetting manual switching means therefor.

Figure 5:
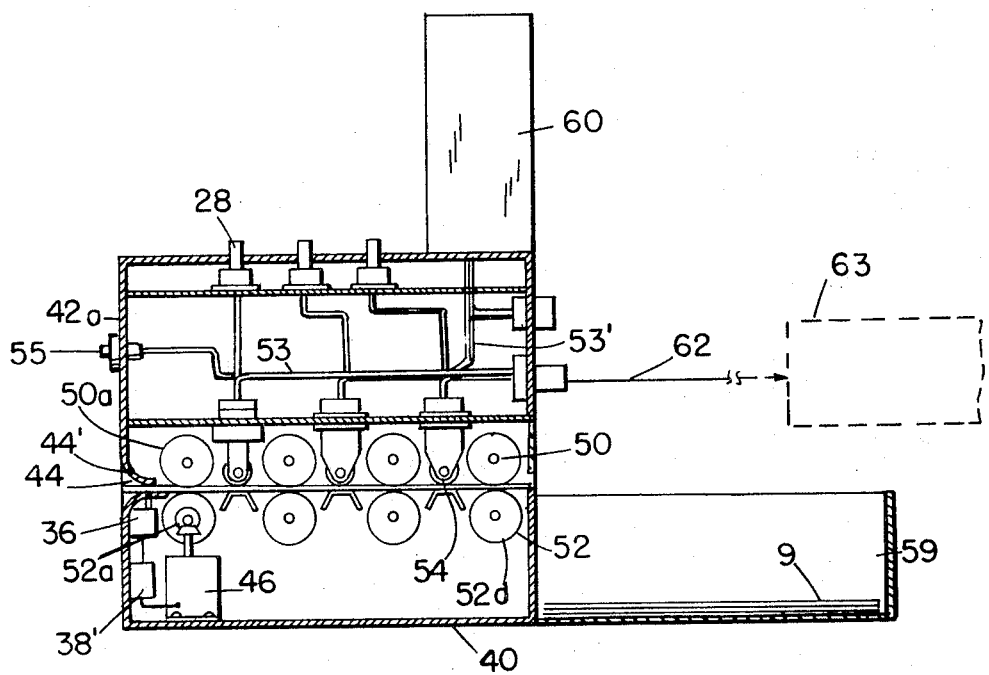
FIG. 5 is an end elevational view of a modified card recorder.
Figure 6:
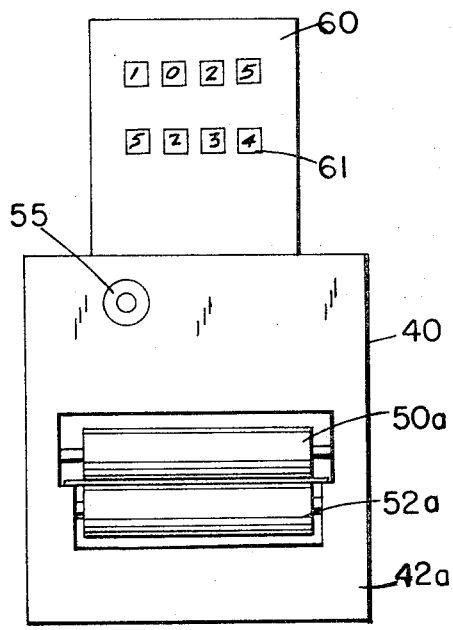
FIG. 6 is a side elevational view, partly broken away, of the recorder of FIG. 5.

FIGS. 5 and 6 illustrate a modified form of the invention in which a card inserted into an opening 44 in a housing 40 is driven completely through the housing and is scanned to provide a parallel code which is operative to provide a visual display indicative of the code itself.

The apparatus illustrated comprises a first box-like housing 40 having an opening 44 through a wall 42a thereof which is shaped and provided with guide means 44' for a record card for guiding the card when it is inserted thereinto between a first pair of rollers 50a and 52a. The lower roller 52a is power operated by a servo motor 46 mounted within the housing, motor 46 being activated by means for sensing the leading edge of the card such as limit switch 36 positioned aaginst the inside face of wall 42a and with an actuator arm thereof projecting into the path of the inserted card. The limit switch is operative as described to activate motor 46, by activating a switching control 38' which is a normally open switch, and suitably of a slow-to-open type. Switching control 38' is operative to retain the motor 46 in operation for driving the bottom drive rolls 52a to 52d for a sufficient period of time to completely drive the inserted card through the housing whereafter it falls into a bin 59 which is an extension of the housing. Numeral 54 designates a bank of pick-up or reading heads which scan the card as it is passed through the housing, 54 being positioned to pick up or reproduce code recordings on respective channels of the recording surface of the cards. If the card is a magnetic recording unit, pick-up heads 54 may comprise conventional magnetic reproduction heads. If the cards contain an optical or visible recording medium such as thermoplastic recording material or other form of erasable markings, heads 54 may comprise photomultiplier tubes or the like provided with the necessary optical scanning means to reproduce markings or recordings on the card and to provide respective pulse signals on the output line 53 of each pick-up. Lines 53 may connect to an output circuit 62 extending to a data processing or storage device 63 and/or the digital, visual reading unit housed in the enclosure 60 provided above the housing 40. The unit or units 61 within housing 60 may comprise any type of pulse operated visual device or devices such as a plurality of Nixie, lamp operated numeral indicating tubes of the type produced by the Burroughs Corporation of Plainfield, N.J., conventional lamps or other visual numerical indicating devices operative to display a number or light up when activated by signals recorded on respective channels of card 9 as said card passes through the reading apparatus, said signals or control signals derived therefrom being transmitted on lines 53' which are branch circuits of the lines 53 connected directly to the transducers or pick-up heads 54. It is assumed, in the apparatus of FIGS. 5 and 6 as well as the other apparatus illustrated herein that the proper amplifying means are provided for all transducers and that the proper power supplies are provided on the correct sides of all switches, amplifiers, relays, controls and the like.

Numeral 55 refers to a switching control in the outputs 53 of the pick-up transducers, such control preferably comprising a bistable switch in each circuit which includes one of the pick-up transducers 54 and a display unit associated therewith and mounted within the housing 60. The visual display or numerical indication activated by each pick-up may be held activated or operative until erased by either manually resetting switch 64 or automatically effecting its operation after a predetermined timed delay or by operating same by coupling a control therefor to the switch 36 to be activated the next time 36 becomes operative by the next card inserted into the housing 40. Thus, a person monitoring the card such as a clerk will have a visual indication, depending on which of those of the indicating devices 61 are activated, of the transaction or recordings on the card 9 just passed through the reader device 40.

It is noted that card 9 may have its entire face 9' covered or coated or with magnetic recording material or strip areas thereof, representing respective channels, so coated.

As in the hereinbefore described drives, the respective rows of rollers or wheels 50 and 52 may be driven by a belt or chain drive arrangement (not shown) coupled to rotate pulleys or wheels connected to the shafts for said wheels or any other suitable gang drive means may be employed to drive the card completely through the housing and, if so activate, in reverse as described.

Figure 7:
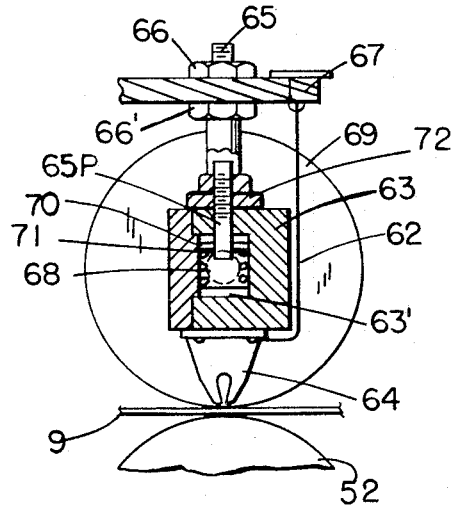
FIG. 7 is a cross sectional side view of a bank of the recording and/or reproduction heads.

A mount for a bank of recording and/or reproduction heads utilized for effecting the transducing of magnetic signals recorded on magnetic cards, is illustrated in FIG. 7 and is particularly applicable to the assemblies illustrated in FIGS. 4 and 6. The recording bank assembly 62 comprises a central mount 63 for a plurality of magnetic transducers 64, mount 63 being adjustably secured to a crossbar 67 by means of respective mounting screws 65 and 66 which are secured to mount 63 and are held in position by a plurality of adjustment nuts 66. The central mount 63 retains an axle 68 or a plurality of aligned pins extending laterally therefrom upon which there are mounted respective wheels or rollers 69 at the ends of mount 63 which engage the card passing through the housing. Wheels 69 not only serve as means for guiding the card but position the upper surface of the card relative to the plural side-by-side recording heads 64 disposed across the housing for recording onto respective channels of the card 9. The lower end of screw 65 has a pin 65P secured within a threaded hole therein. A washer 70 is welded near the end of 65P and rides in a bore 63' in mount 63. A coil spring 71 under compression in the bore 63' urges mount 63 downwardly from crossbar 67 so as to maintain wheels 69 engaged with the card against drive wheels or rollers 52 and the head 64 always at a fixed distance off the recording surface of the card regardless than .0005 inch for most magnetic recording and re-different record cards fed to the apparatus. Magnetic transducers 64 are adjustably positionable with respect to bar 67 so as to place them at a precise distance off the surface of the card by loosening nuts 72 and lowering or raising mount 63 on screw 65. The shafts 68 on which shafts 69 rotate are retained in bearings supported by means (not shown) secured to screws 65. It is preferable that such distance between the end of the magnetic transducer and the face of the card be maintained to within less than .0005 inch for most magnetic recording and reproduction functions.

In another form of the invention, the apparatus illustrated in FIGS. 5 and 6 may be modified to effect recording on and/or reproduction from channels of a magnetic record member, such as the described magnetic oxide surfaced card, without need for utilizing means for driving the card through the housing. If the housing 40 of FIGS. 5 and 6 is disposed with the guide means for the card operative to receive the card from above which falls therethrough by gravity and, as it passes through the housing (the card) is automatically recorded on or scanned, the need for providing a motor to drive the card therethrough will be eliminated. The rolls or rows 50 and 52 thereof may be utilized or replaced by smooth flat strips of metal spaced apart to offer sufficient clearance to the card as it passes through the housing to permit it to fall completely therethrough yet operative to predeterminedly position the card with the respect to the one or more banks of transducers operative to record or reproduce with respect to the recording areas of the card. If the card is adapted to be optically scanned by photoelectric means as it passes downwardly through the housing, it will not be necessary to maintain the surface thereof a precise distance from the scanning transducers for simple reproduction operations. If magnetic recording and/or reproduction transducers are used for scanning, then the guide means for the card may be disposed so as to cause the card to travel during its descent at an angle to the vertical and along a path against and defined by the lowermost guide means so as to cause the bottom face of the card, containing the magnetic recordings, to slide against the magnetic transducers in its downward travel. In another arrangement, the transducers may be mounted on spring loaded bases which always urge the transducers against the recording surface of the card during its downward travel. In a third arrangement, the transducers may be provided on a mount which is coupled to a motor or solenoid drive means which is activated when or after a switch is actuated by the leading edge of the card as the card passes downwardly through the housing.

In still another form of the invention, the apparatus of FIGS. 1 to 4 may be modified whereby the movement of the card into the housing is effected completely by hand in which the card is pulsed into the slotted opening 14 until it can travel no further. When fully inserted, the card leading edge deflects the actuator arm of a switch disposed as shown at the far end of the housing. The switch is then operative to energize the recording and/or reproduction transducers to effect recording and or reproduction relative to respective channels of the card by moving one or more transducers against the card and/or in a wiping action along a predetermined length of the card. If said switch is disposed so as to become actuated before the card has been fully pushed into the housing, it may be utilized to activate heads past which the card is being pushed which are operative to effect recording and/or reproduction functions relative to the card before the card has reached the end of its travel into the housing. In the latter technique, it will not be necessary to move the transducers by means of a servomotor or solenoid although it may be necessary to spring load the transducers so that they will always engage the surface of the card containing the recording channels. Energization of the transducers is preferably operative for a short interval so as to effect pulse recordings during the interval the card is pushed into the housing but not during its withdrawal therefrom.

The apparatus of FIGS. 1 to 7 may be modified to provide recording and/or reproduction by means other than magnetic such as optical, electron beam or other means.

I claim:

1. A record system comprising in combination:
   an oblong, strip-like magnetic recording member such as a record card having magnetic recording material defining a plurality of record tracks on at least one face thereof,
   a housing,
   a plurality of magnetic transducers supported by said housing,
   a slotted opening in a wall of said housing for receiving individual record members,
   means for driving said record members received through said slotted opening past said transducers supported by said housing,
   means for guiding record members as they are fed past said transducers whereby each transducer scans a respective record track,
   manually adjustable means for conditioning respective of said transducers to record signals on the tracks of the record member aligned with said respective transducers,
   a motor operating said driving means,
   control means for said motor including a starting switch adapted to become activated when one end of a record member is inserted into said slotted opening for starting said drive motor, and
   further control means for stopping said motor to deactivate said driving means when a record member has been driven through said housing.

2. Recording apparatus comprising in combination:
   a recorder having a plurality of magnetic transducers arranged to record signals on respective of a plurality of tracks disposed along a magnetic recording surface, an oblong magnetic recording member such as a record card having a plurality of recording tracks, means for guiding and driving individual record members through said recorder past said transducers, means for selectively energizing said transducers during a recording cycle for selectively recording signals onto respective tracks of record members fed past said transducers and comprising a source of electrical energy, a plurality of bistable switches each connecting said source of energy with a respective transducer, a further switching means for normally deactivating said transducers, control means for operating said further switching means for a short time during a recording cycle, limit switch means operative upon sensing the leading edge of a recording member as it is fed to said transducers, said limit switch means connected to said control means for energizing said recording transducer when a record member is predeterminately positioned as it is driven past said transducers whereby record signals are recorded onto respective tracks of said record member.

3. A record system in accordance with claim 2 including a time delay relay operative upon activation of said limit switch means to activate said further switching means for gating signals through the closed bistable switches to said transducers when a recording member is predeterminately located with respect to said transducers.

4. A record system comprising in combination:
a housing,
a plurality of transducers,
means for supporting said plurality of transducers within said housing,
a plurality of individual sheet-like record members such as cards each containing information disposed along separate recording tracks extending lengthwise of said record members,
means for receiving individual record members including a slotted opening to said housing,
guide means for guiding record members inserted into said slotted opening individually past said transducers whereby at least one of said transducers scans a respective track for the reproduction of information therefrom,
a drive motor, means operated by said motor for predeterminately driving individual record members fed to said guide means,
control means operative to activate said drive motor upon insertion of a record member into said slotted opening to cause the record member to be driven past said transducing means,
said control means comprising sensing means including a control switch which is operative upon the insertion of a record member into said slotted opening to effect the operation of said drive motor, and
further control means operative a predetermined time after the activation of said control switch for deactivating said drive motor after a record member has been driven from said housing.

5. A record system comprising in combination:
a plurality of flat, recording members containing information recorded substantially on each,
a housing,
reproduction transducing means supported within said housing,
a slotted opening in the wall of said housing for receiving individual record members,
means for guiding record members through said opening in a predetermined path through said housing,
motor means for driving individual record members through said housing past said transducing means for reproducing the recordings on each record member,
means for receiving signals reproduced in scanning each record as it is fed past said transducing means,
control means for said motor means including means for sensing the leading edge of a record member inserted into said housing,
said sensing means being connected to operate said motor means to drive each record means backwardly through said housing and out said slotted opening after the record member has moved to its farthest point in its travel through said housing to eject the record member from the housing.

6. A record system comprising in combination:
a housing,
transducing means for information recorded on record cards supported within said housing,
means for receiving individual record cards at one end of said housing and means for driving and guiding each record card completely through said housing past said transducing means whereby the transducing means may read information recorded on the card,
said driving means including a drive motor and means operated by said motor for engaging and driving individual cards through said housing,
control means for said drive motor comprising a first limit switch operated when a card is inserted into said receiving means and operative to start said motor to initiate the driving of said card through said housing,
a second limit switch positioned at the other end of said housing for sensing the presence of a card as it is driven through said housing,
said second limit switch being operative to effect the stoppage of said motor when a card has been driven completely through said housing whereby the motor is operative only during a reading cycle.

7. A record system comprising in combination with a plurality of record cards each having a plurality of recording tracks extending longitudinally along the card:
a housing, a plurality of recording transducing means supported within said housing and including at least one transducer operative to record on each of the recording tracks of a card passed through said housing, a slotted opening in a wall of said housing for receiving individual cards,
means for guiding individual cards in a predetermined path through said housing,
drive means including a motor for driving individual cards through said housing past said transducing means,
control means for said motor, means for sensing a record card inserted through said opening into said housing,
presettable selection control means operable to cause the transducing means to be activated or deactivated so as to record or remain inactive during a recording cycle,
recording control means for simultaneously activating all transducers conditioned for recording by said selection means to effect recordings on selected of said plurality of recording tracks as determined by the operation of said manually operative selection means,
said sensing means being operatively connected to said recording control means to activate same after sensing a card inserted into said slotted opening for effecting the recording of information on selected tracks of said card as it is driven through said housing.

8. Apparatus for transducing signals recorded on cards comprising in combination with a housing and including means for receiving individual record cards, guide means for guiding a received card along a substantially predetermined path in a downward direction, the card being made to fall by gravity along the path defined by said guide means, reproduction transducing means predeterminately located with respect to said housing and operative to scan cards as they fall along said guide path, said transducing means being operative to provide output signals of the recordings on a card as it scans said card in movement therepast, and means at the end of said predetermined path for predeterminately receiving cards after the reproduction of signal therefrom.

9. Magnetic signal transducing apparatus comprising in combination with a plurality of record cards each having a plurality of magnetic recording tracks defined by magnetic recording material disposed on said cards:

a housing including means for receiving individual record cards;

guide means supported by said housing for guiding a received card from one end of said guide means along a substantially predetermined path through said housing;

said guide means including opposed members having respective smooth surfaces facing and spaced apart from each other a degree greater than the width of a card so as to define a passageway having sufficient clearance space between said facing surfaces to permit the free passage of a card therebetween without obstruction of the movement of the card by said guide means as the card travels said passageway, transducing means comprising a bank of transducer heads, said transducing means being predeterminately located in said housing with respect to said guide means to operatively dispose the transducer heads with respect to the recording surface of a card passing said transducer heads whereby each of said heads are in transducing relationship with a respective of said plural magnetic recording tracks and may operate to transduce signals relative thereto as the card passes the head;

means for causing individual record cards to travel said predetermined path between said facing surfaces of said opposed members, and means at the end of said predetermined path for receiving each card after completion of the transducing operation by said transducing means.

10. Transducing apparatus for magnetically recording on record cards comprising a transducer assembly including a magnetic transducer head, a base, a moveable support for said transducer head supported by said base, means for receiving and positioning a record card predeterminately with respect to said transducer head, lineal actuating means for advancing said transducer head in a first lineal stroke from a retracted position with respect to said card to a position whereby said transducer head is in operative relation with said predeterminately positioned card to thereafter permit recording on the cards, means operative after the transducer head is advanced and in operative relation with said card for further relatively moving said card and transducer head, and means for energizing said transducer head during said further relative movement of said card and head to effect a recording on the surface of said card.

References Cited

UNITED STATES PATENTS

| | | | |
|---|---|---|---|
| 3,308,451 | 3/1967 | Blackley et al. | 340—174.1 |
| 3,292,171 | 12/1966 | Wilson | 340—324 |
| 3,176,279 | 3/1965 | Lin et al. | 340—174.1 |
| 3,034,712 | 5/1962 | Mead | 340—174.1 |
| 2,910,669 | 10/1959 | Brand | 340—174.1 |
| 2,722,676 | 11/1955 | Begun | 340—174.1 |

BERNARD KONICK, *Primary Examiner.*

V. P. CANNEY, *Assistant Examiner.*

U.S. Cl. X.R.

235—61.11